3,539,592
PRODUCTION OF OXYGEN-CONTAINING ORGANIC COMPOUNDS
Alan Lewis Crowther, Leonard Andrew Duncanson, and Walter Edward Jones, Norton-on-Tees, England, assignors to Imperial Chemical Industries Limited, London, England, a corporation of Great Britain
No Drawing. Filed Aug. 10, 1964, Ser. No. 388,673
Claims priority, application Great Britain, Aug. 19, 1963, 32,649/63; Apr. 6, 1964, 14,029/64
Int. Cl. C07c *51/26, 63/04;* C07d *9/00*
U.S. Cl. 260—343  10 Claims

ABSTRACT OF THE DISCLOSURE

A process is described for the production of esters, particularly lactones, and carboxylic acids by co-oxidizing in the liquid phase an aromatic or saturated aliphatic aldehyde and a ketone which may be a cyclic ketone containing 5 to 12 carbon atoms in the ring, including those which carry substituents that are inert to oxidation, aromatic or saturated aliphatic ketones in which the carbonyl group is external to the cyclic ring, with molecular oxygen at a temperature in the range of 50° to 150° C., the reaction being carried out in the substantial absence of any metal compounds. The lactones produced by the process are useful in the production of organic polymers such as nylon.

---

This invention relates to the production of oxygen-containing organic compounds, including esters, particularly lactones, and carboxylic acids.

It has already been proposed to carry out the co-oxidation of cyclic ketones together with aldehydes by reacting them in the liquid phase with an oxygen-containing gas while providing for the presence, as a catalyst, of a metal compound such as an oxide of ruthenium or palladium or particularly of a metal salt such as cobalt naphthenate or vanadium acetate.

We have now found that in a process for the production of esters, particularly lactones, and carboxylic acids by the co-oxidation of a ketone together with an aldehyde in the liquid phase with molecular oxygen at an elevated temperature, improved results are obtained by avoiding the presence of metallic compounds in the reaction mixture.

Thus, according to the present invention, there is provided a process for the production of esters, particularly lactones, and carboxylic acids by the co-oxidation of a ketone, as hereinafter defined, together with an aromatic or a saturated aliphatic aldehyde in the liquid phase with molecular oxygen at a temperature in the range of 50° C. to 150° C. the reaction being carried out in the absence of deliberately provided metallic compounds possessing catalytic activity under the reaction conditions.

Ketones suitable for use in the present invention are cyclic ketones containing from 5 to 12 carbon atoms in the ring, and aromatic or saturated aliphatic ketones in which the carbonyl group does not form part of a cyclic ring. As described later, the most important starting material is cyclohexanone, but there may also be used cyclopentanone or higher cyclic ketones such as cyclooctanone or cyclododecanone. The cyclic ketones may contain at least one substituent which is substantially inert to oxidation, for example methyl, ethyl, aryl, alkoxy, carbonyl, ester and halide. Ketones in which the carbonyl group does not form part of a cyclic ring which are suitable for use in the present invention are, for example, n-octanone-2 and acetophenone. These ketones in which the carbonyl group does not form part of a ring may include substituents such as alkoxy, carboxyl, ester and halide.

When using a cyclic ketone as the starting material in the present invention, the product contains a lactone. Thus, for example cyclohexanone, the product obtained contains epsilon-caprolactone which is an important raw material in the production of polymers. Similarly, cyclopentanone may be converted to delta-valerolactone, while higher ketones, such as cyclo-octanone and cyclododecanone, are also converted to products comprising lactones. When the starting material is a ketone in which the carbonyl group is not part of a ring, the product is still an ester, but not an internal ester, i.e. it is not a lactone. Thus, the products from n-octanone-2 and acetophenone contain respectively n-hexyl acetate and phenyl acetate.

The aldehydes suitable for use in the present process are preferably lower aliphatic aldehydes, such as acetaldehyde, propionaldehyde and n-butyraldehyde, but higher straight-chain aldehydes up to and including nonaldehyde, may be used. It is also possible to use branched-chain aldehydes such as iso-butyraldehyde. With these higher and branched-chain compounds, however, there is an increased tendency for degradation to occur, i.e. some of the carboxylic acid produced contains fewer carbon atoms than the aldehyde employed. Furthermore, dialdehydes, for example adipaldehydes and aromatic aldehydes, for example benzaldehyde and the tolualdehydes, are also suitable for use in the present invention.

In carrying out the process of the present invention, it is preferable for the "overall molar ratio" as hereinafter defined of aldehyde to ketone to lie in the range of 1:10 to 4:1. More preferably, this "overall molar ratio" lies in the range of 1:5 to 2:1. The term "overall molar ratio" is to be understood as referring to the total quantities of the aldehyde and ketone used in the completed reaction rather than the amounts of the reactants present in the reactor at any one time.

The process can be carried out in a batchwise manner but it is preferable to operate semi-continuously, that is, by having the ketone in a suitable reactor and gradually adding the aldehyde over a period of time, so that the molar proportion of aldehyde present at ane one time is small.

In an even more preferred method of operation, the reaction is carried out in a continuous manner: in this manner of operation both ketone and aldehyde are fed continuously to the reaction zone. They may be fed separately but at closely adjacent points or as a combined stream at a single point. As another alternative, the ketone may be fed continuously into one end of the reactor and aldehyde may be introduced continuously at a succession of points along the reactor.

If desired, the co-oxidation may be carried out in the presence of a diluent which is inert to the reactants and which does not oxidise to an appreciable extent under the operating conditions. It is possible to use, for instance, hydrocarbons which are relatively oxidation-resistant such as benzene, lower esters such as methyl acetate and ethyl acetate, and carboxylic acids, notably acetic acid.

As already stated the present process is operated at a temperature in the range of 50° C. to 150° C., temperatures in the range of 50° C. to 120° C. being preferred. Operations may be carried out at atmospheric pressure, but the use of elevated pressures is frequently desirable. Elevated pressures of up to 50 atmospheres are particularly advantageous. It will be understood that when using an aldehyde and/or diluent which is relatively volatile, elevated pressures may be necessary to ensure reaction in the liquid phase.

The gas containing molecular oxygen employed for carrying out the co-oxidation is suitably oxygen itself or air. If desired molecular oxygen diluted with a suitable inert gas such as nitrogen or carbon dioxide may be employed.

If desired, the present process may be carried out using a reaction initiator. Particularly when operating in a batchwise manner and at a temperature of less than 100° C., such initiators decrease the induction period. Suitable initiators include ultraviolet light; ozone; hydrogen peroxide; an alkyl hydroperoxide or a di-alkyl peroxide having a formula R—O—O—H or R—O—O—R respectively, where R is an alkyl group such as tertiary-butyl; ketone peroxides such as methyl ethyl ketone peroxide; peroxides containing the grouping R.CO, where R is alkyl or aryl, such as acetyl peroxide, benzoyl peroxide, caprylyl peroxide and lauroyl peroxide or cyclohexyl sulphonyl acetyl peroxide; dialkyl peroxy dicarbonates such as di-isopropyl peroxide dicarbonate; peroxy esters such as tertiary-butyl perbenzoate and azo compounds such as azo bis-isobutyronitrile.

In general, in carrying out the process of the present invention it will be understood that a minor amount of over-oxidation can occur, the extent of this depending on the starting materials employed. Thus, in co-oxidation reactions for the conversion of cyclo-hexanone to epsilon caprolactone, minor amounts of adipic acid, glutaric acid and succinic acid are formed.

As already stated, the present process is carried out without deliberately providing for the presence of metallic compounds having a catalytic effect under the reaction conditions. However, there is frequently a tendency in reactions of the type under consideration for metal compounds to be present adventitiously. For instance, metal compounds may be present in low concentrations in the starting materials or they may be introduced on contact of the reactants and/or reaction products with the reaction vessel. In consequence, it is sometimes advantageous for the process of the present invention to be carried out in the presence of sequestering agents. Suitable agents are for example the amino carboxylic acids and their derivatives, such as ethyl diamine tetra-acetic acid hereinafter referred to as ERTA and salts thereof such as the sodium salt; nitrilo triacetic acid and its derivatives; 1,2-diamino cyclohexane tetra-acetic acid and its derivatives; hydroxyethyl derivatives of amino triacetic acid; nitrogen-containing heterocyclic compounds such as $\alpha,\alpha'$-di-pyridyl and dipicolinic acid; organic phosphates and phosphites such as n-octyl phosphate and triphenyl phosphite; polyphosphates; hydroxy carboxylic acids such as citric, glyconic and tartaric; 1,3-diketones such as acetyl acetone; polyamines such as ethylene diamine; Schiff's bases such as disalicylaldehyde ethylene diamine. The cetyl trimethyl ammonium salt of EDTA may also be used, but is usually necessary in this case to use a reaction initiator as hereinbefore described such as benzoyl peroxide.

Because of the need to avoid the presence of metallic compounds having catalytic activity under the reaction conditions it is desirable to select, for use in the process, apparatus unlikely to introduce such compounds into the reaction mixture. Thus, the apparatus may be for example glass, polymeric materials such as polytetrafluorethylene or aluminium. Even when using such apparatus, it is sometimes advantageous to provide for the presence of sequestering agents as hereinbefore described.

The esters produced by the process of the present invention may be used in a wide range of organic reactions, thus the lactones may be used in the production of organic polymers. For example epsilon-caprolactone may be converted to caprolactam for use in the production of nylon or to polyesters which may be cured with di-isocyanates to give elastomers having exceptionally good properties. Caprolactone resins may be used for the manufacture of surface coatings and solid foam-like materials.

EXAMPLE 1

As indicated in the table below, n-butyraldehyde (0.5 mole) was added gradually to cyclohexanone which was maintained at the elevated temperature stated at atmospheric pressure in a glass reactor. Molecular oxygen was passed continuously, at a rate of 24 litres per hour, through the cyclohexanone by means of a hollow cruciform stirrer.

| Run No. | Reaction temp., °C. | Moles cyclohexanone charged | Time of aldehyde addition (hrs.) |
|---|---|---|---|
| 1 | 50 | 1.0 | 1.0 |
| 2 | 75 | 1.0 | 1.0 |
| 3 | 100 | 1.0 | 1.0 |
| 4 | 110 | 1.0 | 1.0 |
| 5 | 120 | 1.0 | 1.0 |
| 6 | 75 | 0.5 | 1.0 |
| 7 | 75 | 1.5 | 1.0 |
| 8 | 100 | 1.0 | 0.5 |
| 9 | 100 | 1.0 | 2.0 |

After the addition of n-butyraldehyde was complete, oxygen was passed through the system maintained at the reaction temperature for a further 15 minutes. The products were worked up and were found to have the compositions given in the following table.

| Run No. | Percent conversion | | Percent molar yields | | |
|---|---|---|---|---|---|
| | Cyclohexanone | Butyraldehyde | Caprolactone | Adipic acid | Butyric acid |
| 1 | 12 | 67 | 94 | 0 | |
| 2 | 23 | 89 | 88 | 2 | 100 |
| 3 | 42 | 95 | 65 | 9 | 85 |
| 4 | 49 | 97 | 50 | 15 | |
| 5 | 40 | 96 | 42 | 11 | 65 |
| 6 | 37 | 92 | 88 | 1 | 100 |
| 7 | 16 | 86 | 86 | 5 | 97 |
| 8 | 28 | 95 | 68 | 7 | 90 |
| 9 | 49 | 93 | 56 | 13 | 82 |

It is evident from the table above that the efficiency of the reaction under consideration for the formation of caprolactone depends upon the reaction temperature (Runs No. 1–5) the molar ratio aldehyde:ketone (Runs Nos. 6 and 7) and the rate of addition of the aldehyde (Runs Nos. 8 and 8). These variables are to some extent at least interdependent: for example, for a given aldehyde:ketone molar ratio and rate of addition of the aldehyde, there is an optimum reaction temperature, this temperature probably differing from that which would be the optimum for a differently selected aldehyde:ketone moler ratio and/or aldehyde feed rate.

EXAMPLE 2

Example 1 was repeated except that various initiators were used. These intiators were as follows:

Run No. 1: no initiator (for comparative purposes).
Run No. 2: 1% by volume of ozone in the oxygen employed.
Run No. 3: 2 grams of tertiary-butyl hydroperoxide in the reaction liquid.
Run No. 4: ultra-violet radiation.
Run No. 5: ultra-violet radiation and 1% by volume of ozone in the oxygen employed.

In all of the runs, the reaction temperature was 75° C. The quantities of cyclohexanone and butyraldehyde were 1.0 mole and 0.5 mole respectively, and the time of aldehyde addition was 1 hour. Oxygen was passed through the reaction liquid at a rate of 24 litres per hour. After the aldehyde addition was complete, oxygen was passed through the system at the reaction temperature for a further 15 minutes. The products were analysed. The conversions of the starting materials and the molar yields of the products obtained are given in the following table:

| Run No. | Percent conversion | | Percent molar yields | | |
|---|---|---|---|---|---|
| | Cyclohexanone | Butyraldehyde | Caprolactone | Adipic acid | Butyric acid |
| 1 | 23 | 89 | 88 | 2 | 100 |
| 2 | 29 | 92 | 79 | 2 | 94 |
| 3 | 25 | 94 | 89 | 3 | 99 |
| 4 | 27 | 90 | 77 | 2 | 88 |
| 5 | 29 | 91 | 75 | 3 | 91 |

It will be observed that the presence of the initiators mentioned increases the conversion of both cyclohexanone and butyraldehyde.

EXAMPLE 3

This example illustrates a continuous operation using n-butyraldehyde and cyclohexanone. A mixture of these compounds in a molar ratio of 1:2 was fed continuously at a total rate of 120 ml. per hour to a reaction vessel maintained at a temperature of 75° C. It was found that 80% of the n-butyraldehyde and 13% of the cyclohexanone underwent conversion. The molar yields of epsilon-caprolactone, adipic acid and n-butyric acid were 95%, 6% and 96% respectively.

This reaction was repeated at a temperature of 100° C., the molar ratio of n-butyraldehyde to cyclohexanone being 1:1.68 and the feed rate of this mixture being 84 ml. per hour. It was found that 95% of the n-butyraldehyde and 32% of the cyclohexanone underwent conversion. The molar yields of epsilon-caprolactone, adipic acid and n-butyric acid were 80%, 12% and 96% respectively.

EXAMPLE 4

To illustrate results obtained with aldehydes other than n-butyraldehyde, experiments were carried out using acetaldehyde and benzaldehyde. In each case, the cyclohexanone to be oxidised was maintained at atmospheric pressure in a glass reactor and the aldehyde co-oxidant was continuously introduced. The overall molar ratio of aldehyde to cyclohexanone was 1:2. In Run No. 1, the temperature of operation was 75° C. and the time of aldehyde addition was two hours. In Run No. 2 the reaction temperature was 85° C. and the time of aldehyde addition was 1 hour. At the end of the reaction time, the products were analysed. The conversions of the starting materials and the molar yields of the products obtained are given in the following table:

| Run No. | Aldehyde | Percent conversion | | Percent molar yield | | |
|---|---|---|---|---|---|---|
| | | Cyclohexanone | Aldehyde | Caprolactone | Adipic acid | Other acids |
| 1 | Acetaldehyde. | 18 | 76 | 56 | | Acetic acid—74. |
| 2 | Benzaldehyde. | 26 | | 71 | 3 | |

EXAMPLE 5

This example illustrates a co-oxidation using a ketone other than cyclohexanone.

n-Butyraldehyde (0.5 mole) was added gradually over a period of two hours to cyclopentanone (1.0 mole) which was maintained at atmospheric pressure and at a temperature of 100° C. in a glass reactor. Molecular oxygen was passed continuously at a rate of 24 litres per hour through the cyclopentanone by means of a cruciform stirrer. The crude reaction product was found to contain unreacted cyclopentanone (0.52 mole), valerolactone (0.14 mole), n-butyric acid (0.44 mole) and glutaric acid (0.049 mole). Thus, the conversion of cyclopentanone was 48% and the yields of valerolactone, glutaric acid and n-butyric acid were 29%, 10% and 93% respectively.

EXAMPLE 6

Over a period of one hour 3,5,5-trimethylhexanal (0.35 mole) was added gradually to cyclohexanone (1.0 mole), which was maintained at 95° C. at atmospheric pressure in a glass reactor. Oxygen was passed continuously at a rate of 24 litres/hour, through the reaction mixture by means of a hollow cruciform stirrer. After the addition of the aldehyde, oxygen was passed through the system, still maintained at 95° C., for a further 15 minutes. The reaction product was analysed and found to show a caprolactone yield of 76% at a cyclohexanone conversion of 34%.

EXAMPLE 7

A mixture of adipaldehyde (0.05 mole) and cyclohexanone (0.75 mole) was maintained at 100° C. at atmospheric pressure in a glass reactor. Oxygen was passed continuously at a rate 24 litres/hour, through the mixture by means of a hollow cruciform stirrer. After 2½ hours the product was analysed and found to show a caprolactone yield of 40% at a cyclohexanone conversion of 18%.

EXAMPLE 8

Over a period of 2½ hours n-butyraldehyde (1.22 mole) was added gradually to 2-methylcyclohexanone (0.75 mole) which was maintained at 95° C. at atmospheric pressure in a glass reactor. Molecular oxygen was passed continuously at a rate of 24 litres/hour, through the 2-methylcyclohexanone by means of a hollow cruciform stirrer. After the addition of the butyraldehyde, oxygen was passed through the system, still maintained at 95° C. for a further 15 minutes. The products were worked up and the pass yield of epsilon-methylcaprolactone was found to be 27% based on 2-methylcyclohexanone.

EXAMPLE 9

The effects of using elevated pressure are illustrated by this example.

As indicated in the table below butyraldehyde (3 moles) was added gradually to cyclohexanone (9 moles) which was maintained at the elevated temperatures and pressures stated in an aluminium lined pressure reactor. Oxygen (5%) diluted with nitrogen (95%) was passed continuously, the nitrogen rate being of 1.5 m.³/hour, through the cyclohexanone.

| Run No. | Pressure (p.s.i.) | Reaction Temperature, °C. | Time of aldehyde addition (hours) |
|---|---|---|---|
| 1 | 200 | 75 | 6 hrs. 2 mins. |
| 2 | 300 | 75 | 5 hrs. 37 mins. |
| 3 | 400 | 65 | 3 hrs. 2 mins. |

When the addition of n-butyraldehyde was complete, oxygen/nitrogen mixture was passed through the system maintained at the reaction temperature for a further 10 minutes. The products were analysed and the following reaction efficiencies were observed.

| Run No. | Percent conversion | | Percent molar yield | | |
|---|---|---|---|---|---|
| | Cyclohexanone | Butyraldehyde | Caprolactone | Adipic acid | Volatile acid [1] |
| 1 | 28 | 94 | 47 | 11 | 88 |
| 2 | 23 | 99 | 62 | 19 | 88 |
| 3 | 17 | 88 | 60 | 4 | 88 |

[1] Namely butyric.

EXAMPLE 10

The following experiments, carried out substantially as described for Example 6, illustrate the beneficial effects of using dipyridyl as a sequestering agent.

| Run No. | Pressure (p.s.i.) | Reaction Temp., °C. | Dipyridyl moles | Time of aldehyde addition | Percent Conversion | | Percent molar yields | | |
|---|---|---|---|---|---|---|---|---|---|
| | | | | | Cyclohexanone | Butyraldehyde | Caprolactone | Adipic acid | Volatile acid |
| 1 | 400 | 65 | 0 | 2 hrs. 51 mins. | 10.0 | 85.0 | 42 | 8 | 76 |
| 2 | 400 | 65 | 0.0058 | 2 hrs. 51 mins. | 12.0 | 81 | 55 | 6 | ND |

The following results illustrate the effect of other sequestering agents on the reaction in the presence of metal added as an organic salt i.e. a naphthenate or stearate using glass apparatus. Over a period of one hour butyraldehyde was added gradually to cyclohexanone (1.0 mole) which was maintained at 75° C. Molecular oxygen was passed continuously, at a rate of 24 litres/hour, through the cyclohexanone by means of a hollow cruciform stirrer.

| Run No. | Metals added | Metal ion concentration, p.p.m. (on total wt. of reactants) | Sequestering agent | Sequestering agent concentration | Initiator |
|---|---|---|---|---|---|
| 3 | Mn<br>Fe<br>Co<br>Ni<br>Zn | 0.5<br>0.7<br>1.3<br>0.3<br>0.5 | None | None | None. |
| 4 | Mn<br>Fe<br>Co<br>Ni<br>Zn | 0.5<br>0.7<br>1.3<br>0.3<br>0.5 | EDTA disodium salt | 0.001375 moles | None. |
| 5 | Co | 10 | None | | Benzoyl peroxide. |
| 6 | Co | 10 | Cetyl trimethyl ammonium salt of EDTA (0.000030 molar). | | 0.005 molar. |

After the addition of the n-butyraldehyde molecular oxygen was passed through the reactor system maintained at the reaction temperature for a further 15 minutes. Analysis of the reaction product gave the following reaction efficiencies.

| Run No. | Percent conversion | | Percent molar yields | | |
|---|---|---|---|---|---|
| | Cyclohexanone | Butyraldehyde | Caprolactone | Adipic acid | Volatile acid |
| 3 | 35 | 99 | 31 | 16 | 96 |
| 4 | 22 | 96 | 50 | 11 | 91 |
| 5 | 41 | 99 | 53 | 11.8 | 100 |
| 6 | 16 | 92 | 72 | 3 | 94.5 |

Further results on the use of sequestering agents in the presence of the metals in the same concentration as Run No. 3 (see the tables above) are given in the following table

| Run No. | Sequestering Agent | Conc. molar | Cyclohexanone conversion | ε-Caprolactone yield | ε-Caprolactone pass yield [1] |
|---|---|---|---|---|---|
| 7 | Dipicollinic acid | 0.0051 | 33 | 79 | 26.1 |
| 8 | Dipyridyl | 0.0034 | 30 | 51 | 15.5 |
| 9 | Triphenyl phosphite | 0.0021 | 23 | 61 | 13.6 |
| 10 | Citric acid | 0.0055 | 29 | 67 | 19.1 |
| 11 | Tartaric acid | 0.0056 | | | 17.9 |
| 12 | Oxalic acid | 0.0055 | | | 16.3 |
| 3 [2] | None | None | 35 | 31 | 10.8 |

[1] Pass yield is the ratio of a percentage of the moles of ε-caprolactone to moles of cyclohexanone present originally.
[2] This is repeated here to facilitate comparison of the results.

EXAMPLE 11

The following experiments illustrate the use of solvents in the process of the present invention.

Over a period of one hour butyraldehyde (0.5 mole) was added gradually to a solution of cyclohexanone (0.5 mole) and the solvent in a glass reactor. The reaction mixture was maintained at atmospheric pressure and the reaction temperature. Molecular oxygen was passed continuously at 24 litres/hour through the cyclohexanone and solvent by means of a hollow cruciform stirrer.

| Run No. | Reaction temperature, °C. | Solvent | Moles of solvent charged |
|---|---|---|---|
| 1 | 75 | Ethylacetate | 0.75 |
| 2 | 50 | Benzene | 1.0 |

After the addition of n-butyraldehyde was complete, oxygen was passed through the system, maintained at the reaction temperature, for a further 15 minutes. Analyses of the reaction product gave the following reaction efficiencies.

| Run No. | Percent conversion cyclohexane | Percent molar yield | |
|---|---|---|---|
| | | Caprolactone | Adipic acid |
| 1 | 34 | 92 | 4 |
| 2 | 156 | (¹) | 0 |

¹ Quantitative.

EXAMPLE 12

The following example illustrates the operation of the process of the present invention when air is used as the oxygen-containing gas.

Over a period of one hour butyraldehyde (0.5 mole) was added gradually to cyclohexanone (1.0 mole), which was maintained at 75° C. at atmospheric pressure in a glass reactor. Air was passed continuously at 36 litres/hour, through the cyclohexanone by means of a hollow cruciform stirrer. After the addition of the n-butyraldehyde, air was passed through the system maintained at 75° for a further 15 minutes. The products were analysed and gave the following reaction efficiencies.

Conversion: Percent
    Cyclohexane _____ 11.9
    Butyraldehyde _____ 67.5
Molar yield:
    Caprolactone _____ 76

EXAMPLE 13

This example shows the preparation of an open-chain ester.

Over a period of three hours n-butyraldehyde (1.5 mole) was added gradually to octanone-2 (0.5 mole) which was maintained at 95° at atmospheric pressure in a glass reactor. Molecular oxygen was passed continuously at a rate of 24 litres/hour through the octanone-2 by means of a hollow cruciform stirrer. After the addition of the n-butyraldehyde, molecular oxygen was passed through the system maintained at 95° for a further 10 minutes. The product was found to contain 0.093 equivalent of ester which corresponds to 1.3 gram of hexyl acetate. Hexyl acetate was isolated by gas liquid chromatography and identified by its infra-red spectrum. A sample of the crude reaction product was hydrolysed with N sodium hydroxide solution and n-hexanol was identified as one of the reaction products.

What is claimed is:

1. A process for the production of esters and carboxylic acids which consists essentially of co-oxidising in the liquid phase an aldehyde selected from the group consisting of saturated aliphatic aldehydes containing 2 to 9 carbon atoms, benzaldehyde, tolualdehydes and adipaldehyde together with a ketone selected from the group consisting of cyclic ketones containing from 5 to 12 carbon atoms in the ring, such ketones substituted with methyl and ethyl groups, alkanones of up to 8 carbon atoms and acetophenone, with molecular oxygen at a temperature in the range of 75° to 150° C., the reaction being carried out in the substantial absence of any metal compounds and the overall molar ratio of aldehyde to ketone being in the range of 1:10 to 4:1.

2. The process of claim 1 wherein the said ketones are selected from the group consisting of cyclohexanone, cyclopentanone, cycloctanone, cyclododecanone.

3. A process as claimed in claim 1 in which the aldehyde is gradually added over a period of time to the whole of the ketone, while adding molecular oxygen.

4. A process as claimed in claim 1 in which both the aldehyde and the ketone are fed continuously to the reaction zone.

5. A process as claimed in claim 1 in which there is present a diluent selected from benzene, methyl acetate, ethyl acetate and acetic acid.

6. A process as claimed in claim 1 in which the pressure is in the range 1 to 50 atmospheres.

7. The process of claim 1 wherein the ketone is cyclohexanone and the aldehyde is selected from the group consisting of acetaldehyde, pripionaldehyde and butyraldehyde.

8. A process for the production of esters and carboxylic acids which consists essentially of co-oxidizing in the liquid phase an aldehyde selected from the group consisting of acetaldehyde and butyraldehyde together with cyclohexanone with molecular oxygen at a temperature in the range of 50° C. to 150° C. and at a pressure from 1 to 50 atmospheres, the reaction being carried out in the substantial absence of any metal compounds and the overall molar ratio of the said aldehyde to cyclohexanone being in the range of 1:10 to 4:1 at the end of the reaction and a sequestering agent is employed, said agent being selected from $\alpha,\alpha'$-dipyridyl, ethylene diamine tetraacetic acid, the sodium salt of ethylene diamine tetra-acetic acid, dipicolinic acid, triphenyl phosphite, citric acid, glyconic acid and tartaric acid.

9. A process for the production of esters and carboxylic acids which consists essentially of co-oxidizing in the liquid phase an aldehyde selected from the group consisting of saturated aliphatic aldehydes containing 2 to 9 carbon atoms, benzaldehyde, tolualdehydes and adipaldehyde together with a ketone selected from the group consisting of cyclic ketones containing from 5 to 12 carbon atoms in the ring, such ketones substituted with methyl and ethyl groups, alkanones of up to 8 carbon atoms and acetophenone, with molecular oxygen at a temperature in the range of 50° C. to 150° C., the reaction being carried out in the substantial absence of any metal compounds and the overall molar ratio of aldehyde to ketone being in the range of 1:10 to 4:1, wherein the reaction is carried out in the presence of a sequestering agent for metal compounds and said sequestering agent is selected from $\alpha,\alpha$-dipyridyl, ethylene diamine tetraacetic acid, the sodium salt of ethylene diamine tetra-acetic acid, dipicolinic acid, triphenyl phosphite, citric acid, glyconic acid, tartaric acid.

10. A process for the production of esters and carboxylic acids which consists essentially of co-oxidizing in the liquid phase an aldehyde selected from the group consisting of saturated aliphatic aldehydes containing 2 to 9 carbon atoms, benzaldehyde, tolualdehydes and adipaldehyde together with a ketone selected from the group consisting of cyclic ketones containing from 5 to 12 carbon atoms in the ring, such ketones substituted with methyl and ethyl groups, alkanones of up to 8 carbon atoms and acetophenone, with molecular oxygen at a temperature in the range of 50° C. to 150° C., the reaction being carried out in the substantial absence of any metal compounds and the overall molar radio of aldehyde to ketone being in the range of 1:10 to 4:1, and wherein there is present a reaction initiator selected from ultraviolet light, ozone hydrogen peroxide, an alkyl hydroperoxide, a di-alkyl peroxide, a ketone peroxide, peroxides containing a grouping R.CO where R is alkyl or aryl, dialkyl peroxy dicarbonates, peroxy esters and azo bis-alkoxy nitriles.

References Cited

UNITED STATES PATENTS

| | | | |
|---|---|---|---|
| 3,278,562 | 10/1966 | Thigpen et al. | 260—348.5 |
| 2,815,355 | 12/1967 | Hill | 260—406 |
| 3,025,306 | 3/1962 | Guest et al. | 260—343 |

FOREIGN PATENTS

| | | |
|---|---|---|
| 738,808 | 10/1955 | Great Britain |
| 886,324 | 1/1962 | Great Britain |

OTHER REFERENCES

Hassall, "The Baeyer-Villiger Oxidation of Aldehydes and Ketones," (Organic Reactions, vol. IX, Ch. 3, Wiley, New York, N.Y. 1957), pp. 87–90.

HENRY R. JILES, Primary Examiner

C. M. SHURKO, Assistant Examiner

U.S. Cl. X.R.

260—343.5, 469, 473, 476, 478, 479, 484, 487, 488, 515, 526, 530; 204—158